(12) United States Patent
Park (10) Patent No.: US 8,956,012 B2
(45) Date of Patent: Feb. 17, 2015

(54) LIGHT-EMITTING DIODE (LED) STREET LIGHT APPARATUS HAVING A HEAT-DISSIPATION STRUCTURE

(75) Inventor: Seung Wook Park, Ansan-si (KR)

(73) Assignee: Leotech, Ansansi (KR)

( * ) Notice: Subject to any disclaimer, the term of this patent is extended or adjusted under 35 U.S.C. 154(b) by 175 days.

(21) Appl. No.: 13/697,514

(22) PCT Filed: Aug. 31, 2010

(86) PCT No.: PCT/KR2010/005872
§ 371 (c)(1),
(2), (4) Date: Nov. 12, 2012

(87) PCT Pub. No.: WO2011/142505
PCT Pub. Date: Nov. 17, 2011

(65) Prior Publication Data
US 2013/0100672 A1    Apr. 25, 2013

(30) Foreign Application Priority Data
May 13, 2010    (KR) .................... 10-2010-0044788

(51) Int. Cl.
*F21V 29/00*    (2006.01)
*F21V 19/00*    (2006.01)
*F21S 8/08*    (2006.01)
*F21W 111/02*    (2006.01)
*F21Y 101/02*    (2006.01)

(52) U.S. Cl.
CPC ............... *F21V 19/001* (2013.01); *F21S 8/086* (2013.01); *F21V 29/004* (2013.01); *F21W 2111/02* (2013.01); *F21Y 2101/02* (2013.01); Y02B 20/72 (2013.01)
USPC ....... 362/249.02; 362/294; 362/431; 362/373

(58) Field of Classification Search
CPC ...... F21S 8/086; F21V 19/001; F21V 29/004; F21V 17/06; F21V 17/08; F21V 21/10; F21W 2111/02; F21W 2131/103
USPC ................ 362/249.02, 249.01, 431, 294, 373
See application file for complete search history.

(56) References Cited

U.S. PATENT DOCUMENTS

2009/0073689 A1*  3/2009  Patrick .......................... 362/234
2010/0046226 A1   2/2010  Cox
2012/0153871 A1*  6/2012  Zeutzius et al. .............. 315/312

FOREIGN PATENT DOCUMENTS

| JP | 3158930 | 3/2010 |
|---|---|---|
| KR | 20-2008-0004939 | 10/2008 |
| KR | 20-0444244 | 4/2009 |
| KR | 10-0900887 | 6/2009 |
| KR | 20-0447650 | 2/2010 |
| WO | 2008-123711 | 10/2008 |

* cited by examiner

*Primary Examiner* — Evan Dzierzynski
*Assistant Examiner* — Naomi M Wolford
(74) *Attorney, Agent, or Firm* — Lexyoume IP Meister, PLLC (57) ABSTRACT

Provided is an LED streetlamp device including a body frame including a flat part and an inclined part extended from a rim of the flat part with a certain incline angle, inner surfaces of the flat part and the inclined part forming a hollow portion, a light emitting part installed on outer surfaces of the flat part and the inclined part, the light emitting part including a plurality of LED lamps, and a transmission plate covering an outer surface of the body frame where the light emitting part is provided, wherein, in a center of the outer surface of the flat part, there is formed a plurality of long holes for allowing air inflow into the hollow portion, the long holes formed circularly around a center point of the flat part.

5 Claims, 6 Drawing Sheets

Fig.1

[Prior Art]

Fig.2

[Prior Art]

LIGHT-EMITTING DIODE (LED) STREET LIGHT APPARATUS HAVING A HEAT-DISSIPATION STRUCTURE

TECHNICAL FIELD

The present invention relates to an LED streetlamp device, and more particularly, to an LED streetlamp device where a plurality of LED light sources are installed in ways that are both horizontal and inclined, thereby providing both uniform direct illumination and peripheral illumination, the LED streetlamp device including a heat radiation configuration to easily discharge heat irradiated from the LED lamps.

BACKGROUND ART

In general, streetlamp devices are lighting fixtures installed along the street to provide safety and security in road traffic. Such streetlamp devices are installed on main roads, roads in business zones and residential zones in suitable forms depending on places thereof. According to the present installation standards of streetlamp devices, when installing streetlamp devices 10 meters above the ground, side illumination occurring in locations 12 meters from right and left sides of a place on the ground, where the streetlamp device is installed, should be 20 lux.

On the other hand, conventional streetlamp devices employ lamps emitting light using the resistance of filaments, which have short lifespans and consume a lot of power. Recently, there have been developed and applied light emitting diode streetlamp devices employing light emitting diode (LED) lamps as light sources, the LED lamps having lifespans longer than those of the lamps employing filaments, the efficiency of the LED lamps being high.

Figure 1:
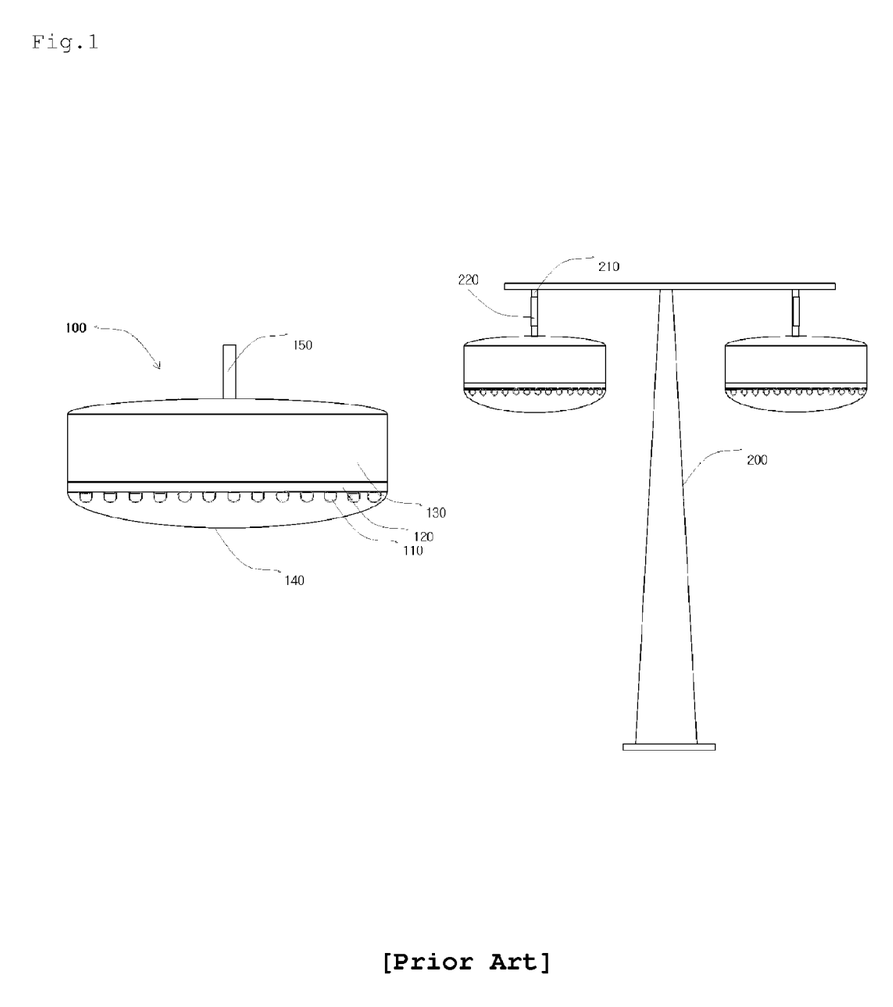
FIGS. 1 and 2 are schematic views illustrating a conventional LED streetlamp device installed in a streetlamp post.

On the other hand, as shown in FIG. 1, a general LED streetlamp device 100 includes a body frame 130 with LED lamps 110 attached as light sources and a reflective plate 120 reflecting light from the LED lamps 110 toward an area directly below or a peripheral area; and a transmission plate 140 manufactured using transparent glass or transparent plastic covering the LED lamps 110 and the reflective plate 120 attached to the body frame 130. Also, on top of the body frame 130, there is provided a fastening portion 150 formed in the shape of a bar or a pipe. Accordingly, the LED streetlamp device 100 may be attached and installed to a connecting bar 210 of a lamppost 200 by coupling the fastening portion 150 therewith using a general coupling member 220 formed of one of a bolt, a nut, and a bracket.

Figure 2:
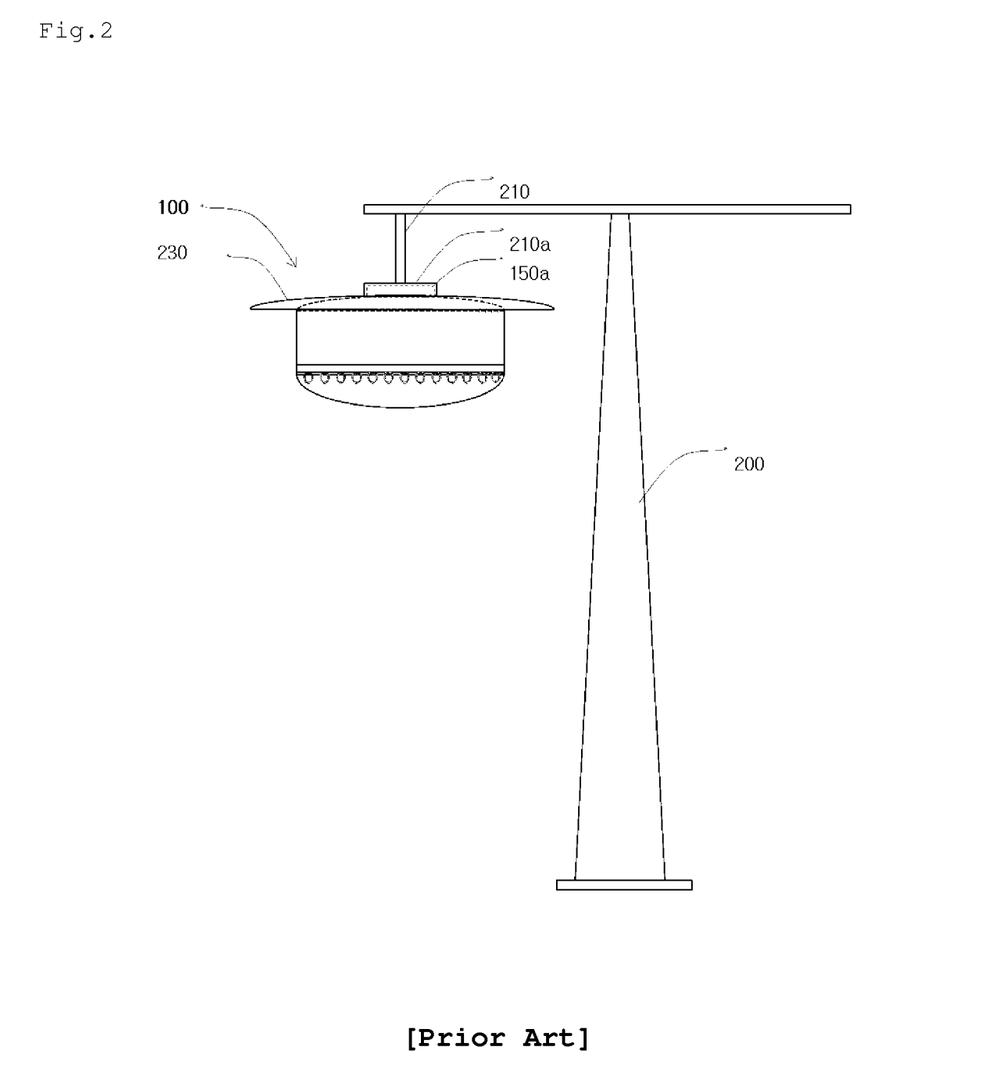

Also, the connecting bar 210 of the lamppost 200, coupled with the fastening portion 150, is formed in the shape of a bar with a certain diameter. However, in some cases, as an example, when providing a shielding member 230 for protecting the streetlamp device 100 together with the connecting bar 210 formed in a single body, as shown in FIG. 2, the connecting bar 210 may have an extended diameter of an end thereof. In this case, the fastening portion 150 of the LED streetlamp device 100 is also designed according to the extended diameter of the connecting bar 210.

Referring to FIG. 2, a reference numeral 210a indicates an extended diameter portion of the connecting bar 210 and a reference numeral 150a indicates an extended diameter portion of the fastening portion 150. Also, in FIG. 2, for example, the extended diameter portion 150a of the fastening portion 150 is coupled with the extended diameter portion 210a of the connecting bar 210 by a screw-connection.

However, since the LED streetlamp device 100 employs a plurality of LED lamps as a light source, heat of a high temperature is emitted according to driving the LED lamps and there occurs damage to diodes, but there has been no effective solution for occurrence of the heat with a high temperature.

DISCLOSURE

Technical Problem

Therefore, considering the above problems, the present invention provides an LED streetlamp device including a heat irradiation configuration to easily discharge heat generated from LED lamps. In detail, the present invention provides an LED streetlamp device having a heat irradiation configuration to allow easily collect a wind blowing from the side of the LED streetlamp device and to flow into a hollow portion inside the LED streetlamp device.

The technical objects of the present invention are not limited to those described above, and it will be apparent to those of ordinary skill in the art from the following description that the present invention includes other technical objects not specifically mentioned herein.

Technical Solution

According to an aspect of the present invention, an LED streetlamp device according to a first embodiment of the present invention includes a body frame including a flat part and an inclined part extended from a rim of the flat part with a certain incline angle, inner surfaces of the flat part and the inclined part forming a hollow portion, a light emitting part installed on outer surfaces of the flat part and the inclined part, the light emitting part including a plurality of LED lamps, and a transmission plate covering an outer surface of the body frame where the light emitting part is provided, wherein, in a center of the outer surface of the flat part, there is formed a plurality of long holes for allowing air inflow into the hollow portion, the long holes formed circularly around a center point of the flat part.

Advantageous Effects

According to the configuration as described above, through an air inflow path formed of the circular arc-shaped long holes and the connecting hole, the air flows from the outside into the hollow portion and flows out, thereby easily discharging heat inside the hollow portion of the streetlamp device emitting the heat generated by heating of the LED lamps.

BEST MODE FOR CARRYING OUT THE INVENTION

Hereinafter, embodiments of the present invention will be described in detail with reference to the accompanying drawings to be easily executed by those skilled in the art. However, the present invention may be embodied in various different forms and is not limited to the embodiments to be described hereafter.

Figure 3:
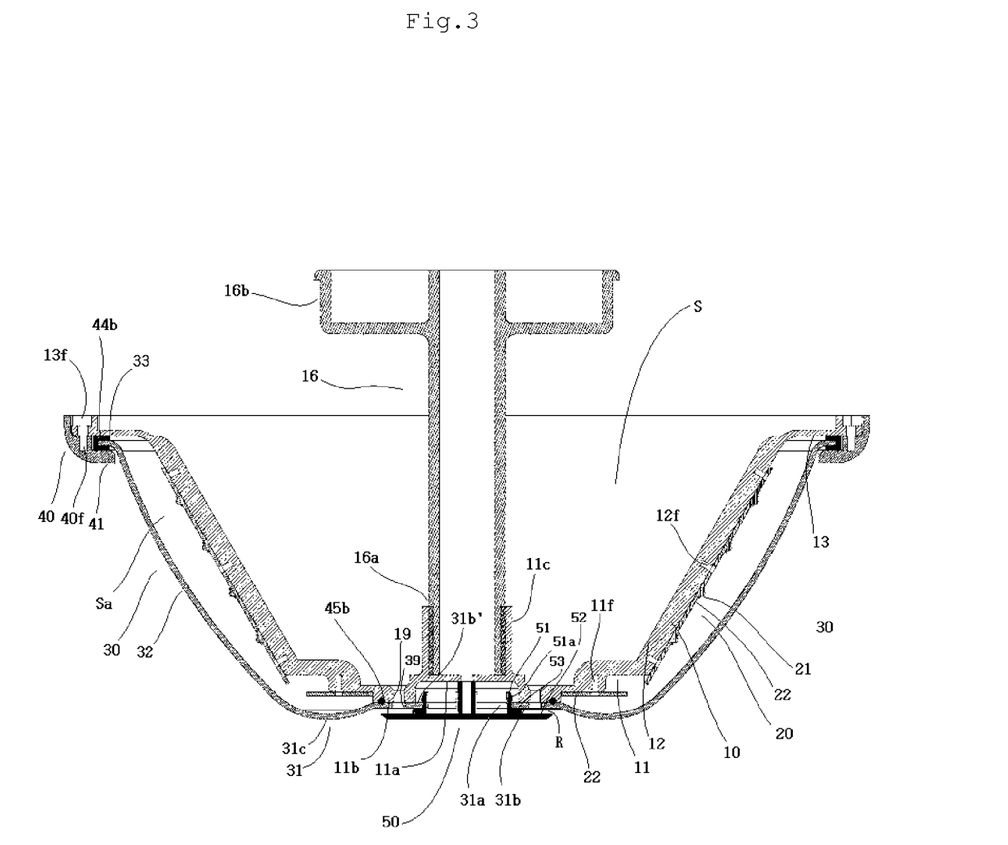
FIG. 3 is a cross-sectional view illustrating an LED streetlamp device.

FIG. 3 is a side cross-sectional view illustrating an LED streetlamp device according to an embodiment of the present invention.

As shown in the drawing, the LED streetlamp device includes a body frame 10 including a flat part 11 formed of a flat plane, an inclined part 12 extended from the flat part 11 with a certain incline angle, and a rim part 13 (coupling part) horizontally extended from an end of the inclined part; a light emitting part 20 including a plurality of LED lamps 21 attached to the flat part 11 and the inclined part 12; and a transmission plate 30 covering an outer surface of the body frame where the light emitting part 20 is attached to and including a flat transmission part 31 located on top of the flat part 11, an inclined transmission part 32 located on top of the inclined part 12, and a rim part 33 located on top of the rim part 13.

In this case, the light emitting part 20 is a component formed of the plurality of LED lamps 21 on a base board 22 that may be a PCB and is attached to the flat part and the inclined part of the body frame using coupling means such as screws and coupling holes 11f and 12f formed on the flat part 11 and the inclined part 12.

In this case, the light emitting part 20 is attached to an outer surface of the flat part 11 and the inclined part 12 of the body frame 10 and an inner surface thereof is formed of a hollow portion S to discharge heat generated from the LED lamps.

On the other hand, a center portion of the outer surface of the flat part of the body frame 10 includes a central dented portion 11a dented with a certain depth and a ring-shaped projection portion 11b surrounding the dented portion 11a in a ring shape while projecting against the dented portion 11a, in which there is formed a long hole 19 formed in the shape of a circular arc.

Also, in a center of the inner surface of the body frame 10, there is formed a fastening portion 11c to be coupled with a connecting bar 210 (not shown) of the lamppost. The fastening portion 11c is formed in the shape of a cylindrical pipe vertically extended from the center portion of the flat part 11. On the other hand, on one of inside or outside of a free end of the fastening portion 11c, there is formed a screw-thread, a connecting element 16 being installed using the screw-thread.

In this case, the connecting element 16 includes a first diameter portion 16a attached to the end of the cylindrical fastening portion 11c in such a way that a diameter thereof is formed as the same as that of the cylindrical fastening portion and a second diameter portion 16b attached to the lamppost, a diameter thereof being extended more than that of the first diameter portion 16a.

In FIG. 3, screw threads are provided on the inside of the fastening portion 11 and the outside of the first diameter portion 16a and used to insert the connecting element 16 into the fastening portion 11c. Also, though it is shown that the second diameter portion 16b has a diameter greater than that of the first diameter portion 16a, the diameter of the second diameter portion 16b may be determined according to a diameter of an end (a connecting portion) of the streetlamp post. For example, when the diameter of the end of the streetlamp post is the same as that of the first diameter portion 16a, the connecting element 16 may be provided as being without the second diameter portion 16b. In other words, the connecting element 16 may be manufactured to be in the shape of one of a cylinder and a hexahedron with the same diameter as that of the first diameter portion 16a.

In this case, a center of the flat transmission part 31 of the transmission plate 30 includes a central opening portion 31a and a ring-shaped holding portion 31b surrounding the opening portion 31a and holding the ring-shaped projection portion 11b while there is being formed a connecting hole 39 formed in the same shape as that of the circular arc-shaped long hole.

Figure 4:
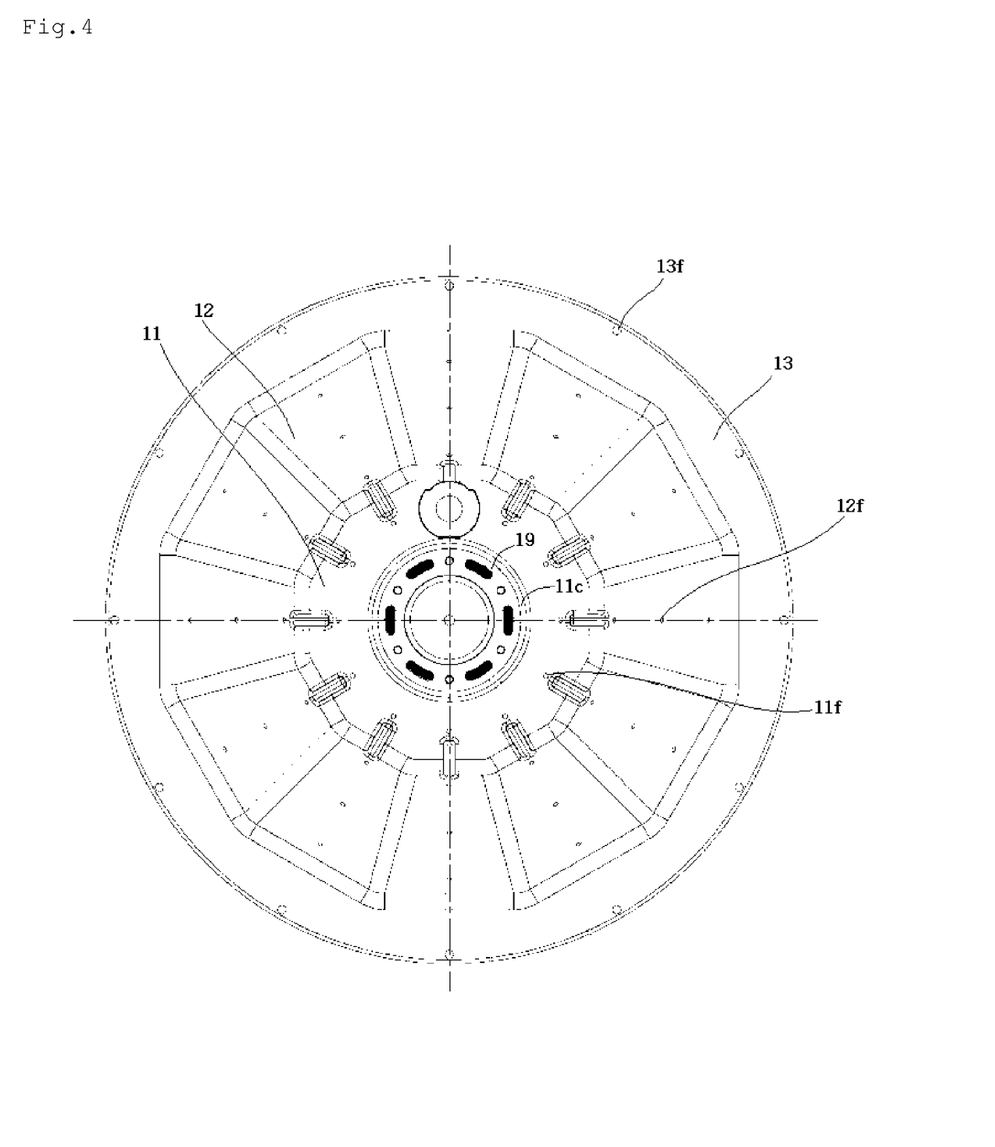
FIG. 4 is a schematic top view illustrating the LED streetlamp device.

On the other hand, FIG. 4 is a top view illustrating the hollow portion S of the body frame where the connecting element 16 is removed, in which there are shown the fastening portion 11c for fastening the connecting element 16 formed in a center of an inner surface of the flat part 11 and a plurality of circular arc-shaped long holes for inflow of air into the hollow portion S formed surrounding a center point shown as a cross on the outside of the fastening portion 11c in a circular shape. Though there are shown circular arc-shaped long holes 19 formed in the same size, the size thereof may be different from one another to allow a flow of air between the inside of the hollow portion and the outside to be more smooth. Also, a curvature of the circular arc-shaped long holes 19 may be formed in the same as that of the fastening portion 11c.

Also, the flat part 11 has a plane with 12 sides. That is, 12 edges are formed on a rim of the flat part 11. Also, since the inclined part 12 is extended upward from the rim of the flat part 11 with 12 sides by a certain angle, a surface thereof is formed with 12 sides. In other words, the inclined part 12 is extended from an end of the flat part 11 toward the rim part 13 in such a way that an inner diameter thereof is extended and each side has a trapezoidal shape.

Also, on a surface of the rim part 13, there are formed a plurality of coupling holes 13f, thereby fastening the transmission plate 30 to the body frame 10.

On the other hand, coupling between the body frame 10 and the transmission plate is performed by a fastening bracket 40 with an insertion hole 40f connected to the coupling hole 13f formed therein, the fastening bracket 40 including a pressurizing part 41 held by the rim part 33 of the transmission plate 30 and pressurizing the rim part 33 toward the rim part 13 of the body frame. On the other hand, such fastening bracket 40 is formed in the shape of a ring according to the shape of the rim parts 13 and 33 to cover the rim parts 13 and 33. Accordingly, the rim parts 13 and 33 are allowed to match each other and the insertion hole 40f and the coupling hole 13f are screw-fastened to each other, thereby coupling the body frame 10 with the transmission plate 30.

In the coupling, the central opening portion 31a of the transmission plate 30 is located on the dented portion 11a of the body frame and the ring-shaped holding portion 31b holds the ring-shaped projection portion 11b. Also, an end 31b' of the ring-shaped holding portion 31b of the transmission plate 30 is horizontally extended toward the dented portion 11a. The end 31b' of the ring-shaped holding portion 31b becomes a fastening portion of a shielding plate 50 described later. Also, in this case, the circular arc-shaped connecting hole 39, as definitely shown in FIG. 3, are formed in such a way that a location of an opening thereof is matched with that of an opening of the circular arc-shaped long hole.

Meanwhile, when coupling the body frame 10 with the transmission plate as described above, a space Sa surrounded by the outer surface of the flat part and the inclined part of the body frame 10, where the light emitting part 20 is installed, and inner surfaces of the flat transmission part and the inclined transmission part of the transmission plate is sealed from the outside in order to prevent inflow of humidity and other pollutants.

For this, before the coupling, on an end of the rim part 33 and an outer surface of the ring-shaped projection portion 11*b*, for example, bushings 44*b* and 45*b* formed of rubber are put. In FIG. 3, the bushing 44*b* formed in the shape of ⊂ is put on the end of the rim part 33 and interposed between the rim parts 13 and 33, and the bushing 45*b* formed in the shape of o is interposed between the ring-shaped projection portion 11*b* and a contact surface of the ring-shaped holding portion 31*b*.

Accordingly, while matching the rim parts 13 and 33 with each other, the fastening bracket 40 is screw-fastened to the rim part 13 using the insertion hole 40*f* and the coupling hole 13*f*, thereby coupling the body frame 10 with the transmission plate, simultaneously with sealing the space Sa from the outside.

On the other hand, the LED streetlamp device further includes the shielding plate 50 covering the dented portion 11*a*, the opening portion 31*a*, and the ring-shaped holding portion 31*b* in order to improve an external appearance simultaneously with allowing inflow of air via a vertical air inflow path formed of the long hole 19 and the connecting hole 39 to be easily performed.

Such shielding plate 50 includes a vertical extension part 51 for fitting, vertically extended upward to be attached to the central opening portion 31*a* of the transmission plate 30, an outer surface of a top end of the vertical extension portion being protruded outward to form a protrusion 51*a*, a horizontal extension part 52 extended from a bottom end of the vertical extension part 51 in a longitudinal direction (a lateral direction in FIG. 3) to be separated from the connecting hole 39 and located on top of the connecting hole 39, and a thickness enlargement part 53 formed by enlarging a thickness of a joint portion of the vertical extension part 51 and the horizontal extension part 52 in such a way that the horizontal extension part 52 is located being separated from the connecting hole.

Accordingly, the vertical extension part 51 is inserted into the dented portion 11*a* and the opening portion 31*a* in such a way that the protrusion 51*a* fits a rear of the end 31*b*' of the holding portion and the end 31*b*' pressurizes a side of the vertical extension part 51 below the protrusion 51*a*. Also, the thickness enlargement part 53 is located in contact with a surface of the end 31*b*' of the holding portion. Accordingly, the horizontal extension part 52 is separated from the connecting hole 39 and located on top of the connecting hole 39. Accordingly, a horizontal air inflow path is formed by a surface of the ring-shaped holding portion 31*b* and an opposite surface of the vertical extension part 52.

In other words, an air inflow path R is formed of the horizontal air inflow path formed of the surface of the ring-shaped holding portion 31*b* and the opposite surface of the horizontal extension part 52 and the vertical air inflow path formed by connecting the long hole 19 to the connecting hole 39. Accordingly, the wind blowing from the side of the streetlamp device may be allowed to be collected by the horizontal air inflow path and to flow into the vertical air inflow path.

Meanwhile, in FIG. 3, though it is shown that the horizontal extension part 52 is horizontally extended parallel to the ring-shaped holding portion 31*b*, preferably, a free end of the horizontal extension part 52 may be separated from and inclined toward the holding portion 31*b*, thereby increasing an inflow amount of air into the connecting hole 39 and the long hole 19.

Also, with respect to the flat transmission part 31 of the transmission plate 30, an outside of the ring-shaped holding portion 31*b* is protruded with a certain height from a surface thereof and forms a protrusion 31*c*. Such protrusion 31*c*, formed, preferably, flush with the horizontal extension part 52 to have the same height, as shown in FIG. 6, thereby allowing the shielding plate 51 and the air inflow path R not to be expose outward in a side view.

Figure 5:
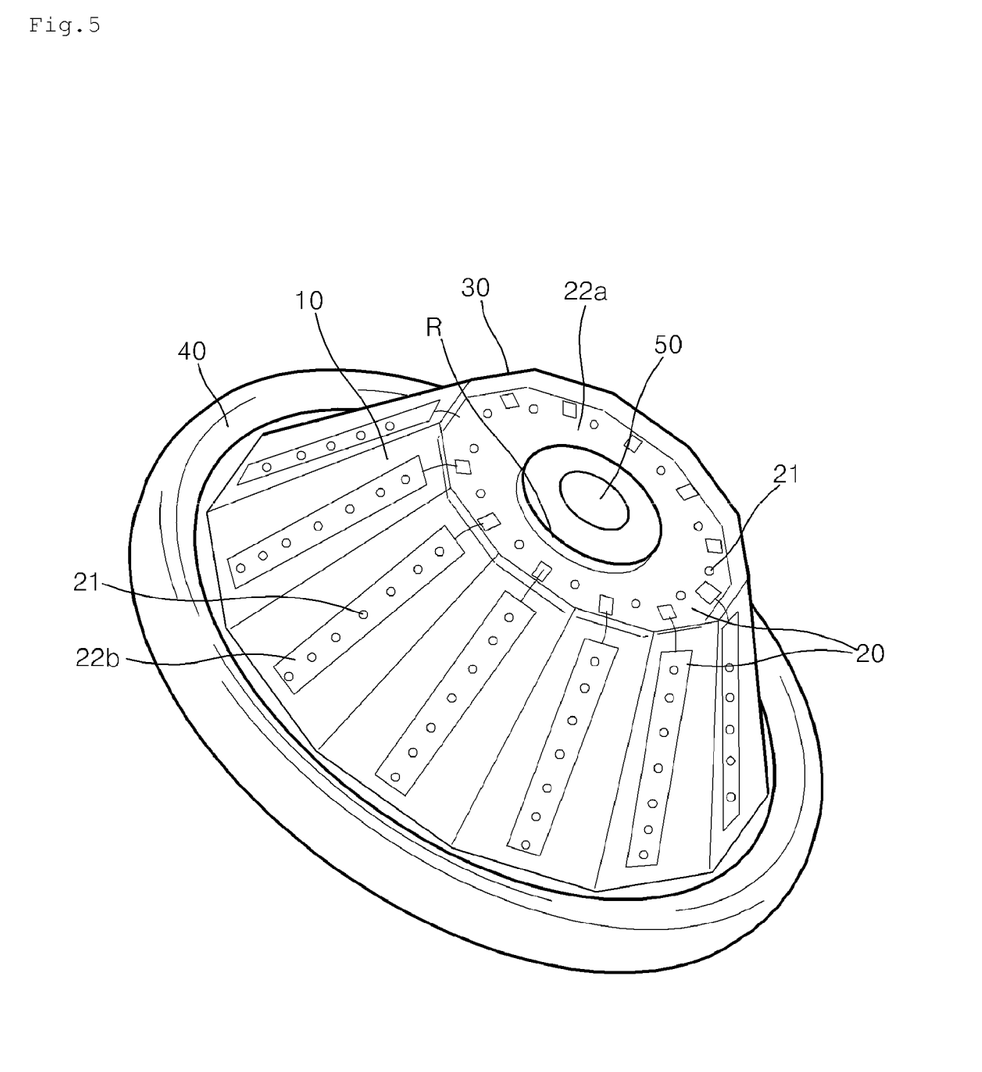
FIG. 5 is a perspective view illustrating the LED streetlamp device.

Meanwhile, FIG. 5 is a perspective view illustrating the LED streetlamp device including the body frame 10, the light emitting part 20 installed on the flat part 11 of the body frame 10 including a circular base plate 22*a* and the LED lamps 21, the light emitting part 20 installed on the inclined part 12 including a quadrilateral base plate 22*b* and the LED lamps 21, and the transmission plate 30 covering the body frame 10 where the light emitting part 20 is installed. Also, in the drawing, the transmission plate 30 is coupled with the body frame 10 by the fastening bracket 40. Also, the flat part 11 of the body frame is formed in a polygonal shape, and the inclined part 12 is formed with 12 trapezoidal sides.

Also, since the shielding plate 50 is installed on the central opening portion of the transmission plate, it is definitely shown that the horizontal air inflow path R formed by the horizontal extension part 52 and the surface of the ring-shaped holding portion 31*b* is formed in a ring shape.

Figure 6:
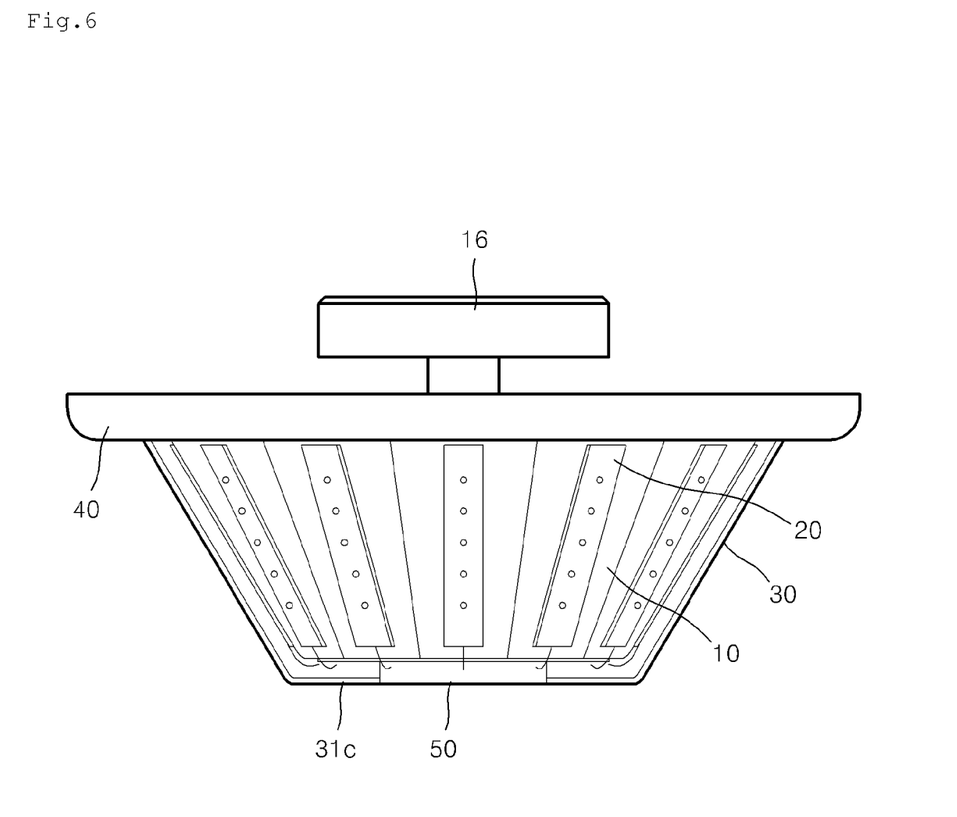
FIG. 6 is a side cross-sectional view illustrating the LED streetlamp device.

FIG. 6 is a side view illustrating the LED streetlamp device, in which the shielding plate 50 and the air inflow path R are shielded by the protrusion 31*c* and not exposed outward. Also, it is shown that the connecting element 16 for fastening to the streetlamp post is projected on top of the ring-shaped fastening bracket 40.

The invention claimed is:

1. An LED streetlamp device comprising: a body frame comprising a flat part and an inclined part extended from a rim of the flat part with a certain incline angle, inner surfaces of the flat part and the inclined part forming a hollow portion; a light emitting part installed on outer surfaces of the flat part and the inclined part, the light emitting part comprising a plurality of LED lamps; and a transmission plate covering an outer surface of the body frame where the light emitting part is provided, wherein, in a center of the outer surface of the flat part, there is formed a plurality of long holes for allowing air inflow into the hollow portion, the long holes formed circularly around a center point of the flat part, wherein, in a center of the transmission plate, there is formed a connecting hole formed in the same shape as that of the long hole, wherein, while coupling the transmission plate with the body frame, the connecting hole is located on top of the long hole being in contact therewith, wherein the center of the outer surface of the flat part of the body frame comprises a central dented portion dented with a certain depth and a ring-shaped projected portion surrounding the dented portion in a ring shape and projected compared with the dented portion, on the ring-shaped projected portion the long hole being formed, wherein the center of the transmission plate comprises a central opening portion located on the dented portion and a ring-shaped holding portion surrounding the opening portion in a ring shape and holding the ring-shaped projected portion, on the ring-shaped holding portion the connecting hole being formed, wherein a shielding plate separated from the connecting hole of the transmission plate and partially covering the connecting hole is attached to the central opening portion, wherein the shielding plate comprises a vertical extension part for fitting vertically extended upward to be attached to the central opening portion of the transmission plate, on a top end of the vertical extension part a protrusion being protruded outward, a horizontal extension part extended from a bottom end of the vertical extension part and located on top of the connection hole, and a thickness enlargement part formed by enlarging a thickness of a contact portion of the vertical extension part and the horizontal extension part in such a way that the horizontal extension part is located being separated from the connecting hole, and wherein the protrusion fits a rear of the ring-shaped holding portion and the thickness enlargement part is located in front of the ring-shaped holding portion.

2. The LED streetlamp device of claim 1, wherein the flat part has a polygonal plane.

3. The LED streetlamp device of claim 2, wherein the inclined part is formed of trapezoidal sides extended from edges of the polygonal plane.

4. An LED streetlamp device comprising: a body frame comprising a flat part and an inclined part extended from a rim of the flat part with a certain incline angle, LED lamps being provided outer surfaces of the flat part and the inclined part, inner surfaces thereof forming a hollow portion; a transmission plate covering outer surface of the body frame; and a shielding plate covering a central opening of the transmission plate, wherein the LED streetlamp device comprises a vertical air inflow path penetrating the body frame and the transmission plate and connecting the outside to the hollow portion and a horizontal air inflow path formed by a flat transmission part of the transmission plate and a surface of the shielding plate and extended horizontally along the flat transmission part to be connected to the vertical air inflow path.

5. The LED streetlamp device of claim 4, wherein the flat transmission part of the transmission plate is protruded to form a protrusion simultaneously with surrounding the horizontal air inflow path.

\* \* \* \* \*